United States Patent
Zou

(10) Patent No.: US 6,663,077 B2
(45) Date of Patent: Dec. 16, 2003

(54) SUCKER STRUCTURE

(76) Inventor: Dejun Zou, 18C-29 Building, Meilin Yicun, Shenzhen City Guangdong Provence 518049, P.R. (CN)

( * ) Notice: Subject to any disclaimer, the term of this patent is extended or adjusted under 35 U.S.C. 154(b) by 0 days.

(21) Appl. No.: 09/902,967

(22) Filed: Jul. 11, 2001

(65) Prior Publication Data

US 2002/0113181 A1 Aug. 22, 2002

(51) Int. Cl.[7] ................................................ A47G 1/17

(52) U.S. Cl. ................ 248/683; 248/205.5; 248/206.2; 248/205.8

(58) Field of Search ............................ 248/683, 205.5, 248/206.2, 205.8

(56) References Cited

U.S. PATENT DOCUMENTS

| | | | | |
|---|---|---|---|---|
| 2,146,859 A | * | 2/1939 | Seklehner | 248/205.5 |
| 2,968,460 A | * | 1/1961 | Van Dusen | 248/205.3 |
| 4,133,575 A | * | 1/1979 | Mader | 248/205.8 |
| 5,176,346 A | * | 1/1993 | Liu | 248/205.8 |
| 6,154,929 A | * | 12/2000 | Dwyer | 16/422 |

* cited by examiner

Primary Examiner—Leslie A. Braun
Assistant Examiner—Ingrid Weinhold
(74) Attorney, Agent, or Firm—Jones, Tullar & Cooper, P.C.

(57) ABSTRACT

The invention provides a sucker structure comprising a sucker body made from flexible materials including a base portion having a central blind hole being of a T-shaped cross-section; a rim portion having an annular projection, a recess and a flat outmost edge; and a declining intermediate portion connected between the base portion and the rim portion, wherein the recess is located between the projection and the declining intermediate portion; a supporting disk including an annular edge portion comprising a first annular groove for engaging the annular projection of the sucker body therein and a second annular groove outside of the first annular groove; a sealing filler engaged with the semi-circular groove; a threaded rod including a rod body with a male thread thereon and an flange at one end thereof, wherein the flange is inserted into the central blind hole of the base portion of the sucker body and formed as an integral with the sucker body; and an adjusting nut member engaged with the threaded rod by a female thread thereon and the male thread on the rod body.

5 Claims, 3 Drawing Sheets

SUCKER STRUCTURE

FIELD OF THE INVENTION

The present invention relates to a sucker structure, and more particularly, to a sucker structure capable of firmly adhering to a smooth surface for hanging an article therefrom.

BACKGROUND OF THE INVENTION

There have been many suckers in the prior art for adhering an article to a smooth surface such as a vertical ceramic wall or a glass surface. For example, Chinese Patent No. 96120270.X owned by the inventor discloses such a sucker structure. As shown in FIG. 5 of the patent, the sucker structure comprises a sucker body 1 for contacting a smooth surface, a supporting disk 2 for sticking the sucker body 1 to the smooth surface firmly a threaded rod with a rod body 3 and an end flange 21 that is inserted in the body 1 integrally, an adjusting nut member 4 engaged with the threaded rod, and a connecting sleeve 5 over the nut member 4 for hanging an article in use. However, this sucker structure may be unexpectedly detached from the smooth surface if the article hangs for a long time. Therefore, it is desired to provide a sucker structure with which the article can firmly be hung from the smooth surface for a longer time.

SUMMARY OF THE INVENTION

An object of the invention is to provide a sucker structure capable of firmly adhering to a smooth surface for hanging an article for a long time.

According to an embodiment of the invention, a sucker structure comprises:
- a sucker body made from flexible materials, including a base portion having a central blind hole being of a T-shaped cross-section; a rim portion having an annular projection, a recess and a flat outmost edge; and a declining intermediate portion connected between the base and the rim portion; wherein the recess is located between the projection and the declining intermediate portion;
- a supporting disk including an annular edge portion with a first annular groove for engaging the annular projection of the sucker body therein;
- a threaded rod including a rod body with a male thread thereon and an flange at one end, wherein the flange is inserted in the central blind hole of the base portion of the sucker body and formed an integral with the sucker body; and
- an adjusting nut member engaged with the threaded rod by a female thread therein and the male thread on the threaded rod.

According to another embodiment of tile invention, a sucker structure comprises:
- a sucker body made from flexible materials including a base portion having a central blind hole being of a T-shaped cross-section; a rim portion having an annular projection, a recess and a flat outmost edge; and a declining intermediate portion connected between the base portion and the rim portion, wherein the recess is located between the projection and the declining intermediate portion;
- a supporting disk including an annular edge portion comprising a first annular groove for engaging the annular projection of the sucker body therein and a second annular groove outside of the first annular groove;
- a sealing filler engaged with the semi-circular groove;
- a threaded rod including a rod body with a male thread thereon and an flange at one end thereof, wherein the flange is inserted into the central blind hole of the base portion of the sucker body and formed as an integral with the sucker body; and
- an adjusting nut member engaged with the threaded rod by a female thread therein and the male thread on the rod body.

The sucker structure according to the invention may further comprise a connecting sleeve member over the adjusting nut member for hanging an article. It is obvious for those skilled in the art that the connecting sleeve member may be replaced with any other suitable connecting member. For example, a hook may be formed on the nut member to hang the article. Furthermore, the nut member may be formed with a hole to insert a bar assembled with a plurality of hooks.

DETAILED DESCRIPTION OF THE PREFERRED EMBODIMENT

The invention will be apparent from the following detailed description of some preferred embodiments in combination with the accompanying drawings.

Figure 1:
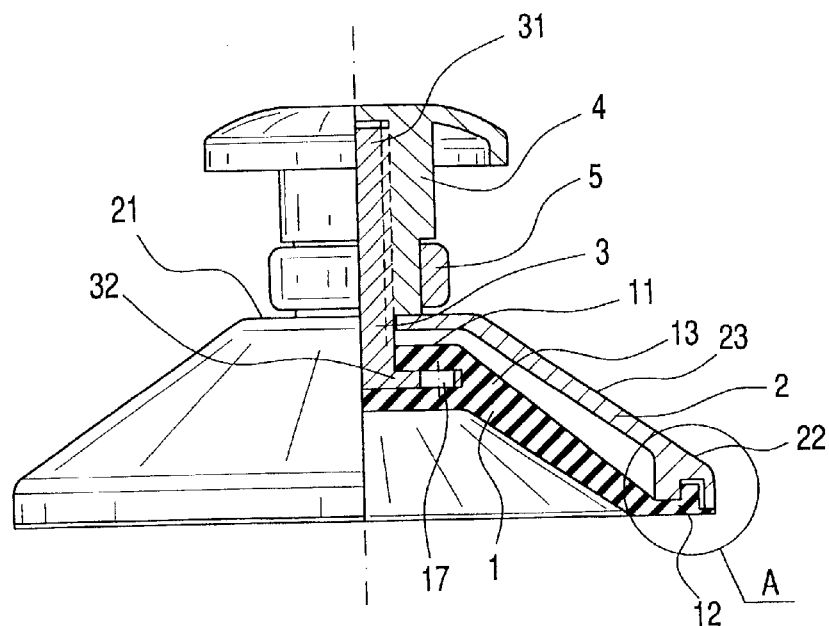
FIG. 1 is a partial cross-section view of a sucker structure according to one preferred embodiment of the present invention.
Figure 2:
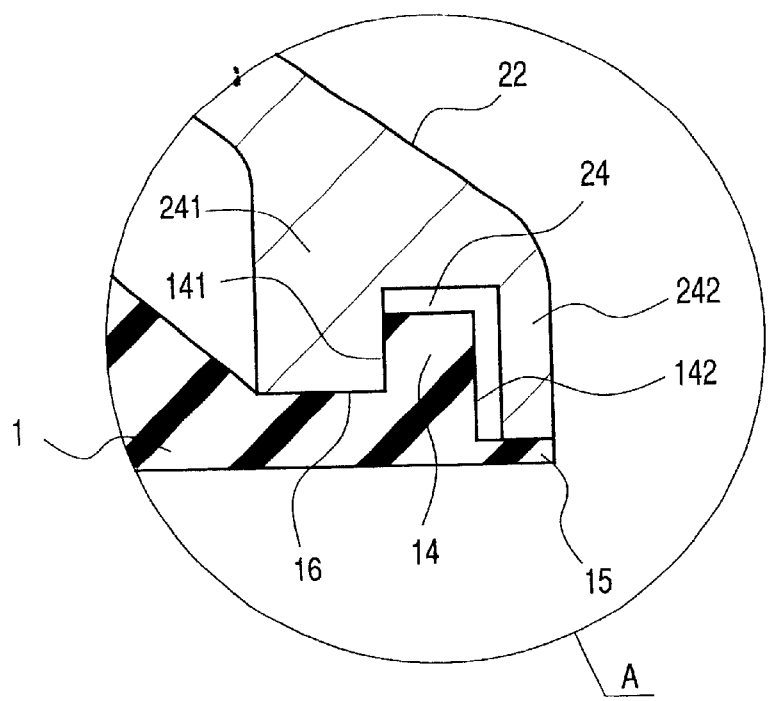
FIG. 2 is an enlarged view of section A in FIG. 1.

Now referring to FIGS. 1 and 2, which show a sucker structure of one preferred embodiment according to the present invention. The sucker structure mainly comprises a sucker body 1, a threaded rod 3, a supporting disk 2, and an adjusting nut member 4.

The sucker body 1 is generally made from flexible materials such as rubber and soft plastics. The sucker body 1 is in the shape of a tapered umbrella and comprises a base portion 11, a rim portion 12 and a declining intermediate portion 13. The base portion 11 comprises a central blind hole with an inverted T-shaped cross-section as shown in FIG. 1. The rim portion 12 has an annular projection 14 and an annular recess 16 with a flat surface formed between the projection 14 and the intermediate portion 13. The declining intermediate portion 13 between the base portion 11 and the rim portion 12 may be of a tapered cross-section as shown in FIG. 1. At the outside of the projection 14 the rim portion also compuses an outmost flat annular edge 15.

The threaded rod 3 comprises a rod body 31 with a male thread thereon and a flange 32 at the lower end thereof, which is engaged with the base portion 11 of the sucker body 1. As shown in FIG. 1, the threaded rod 3 is of a T-shaped cross-section.

The supporting disk 2 is in general made from rigid materials such as hard plastics and metal. The supporting disk 2 is of a shape similar to that of the sucker body 1 and comprises a base portion 21 with a central through hole to allow the rod body 31 to pass, an edge portion 22 and a declining immediate portion 23 between the base portion 21 and the edge portion 22. The edge portion 22 has an annular U-shaped groove 24 engaged with the above-mentioned annular projection 14 of the rim portion 12 of the sucker body 1.

In one embodiment of the invention, the annular projection 14 may be formed to have an inner surface 141 and an outer surface 142 higher than the inner surface 141. In this case, the U-shaped groove 24 also comprises an inner wall 241 and an outer wall 242 corresponding to the inner surface 141 and the outer surface 142 of the sucker body 1, respectively. The engagement between the projection 14 and the U-shaped groove 24 facilitates to form a seal between the sucker body 1 and a smooth surface (not shown).

The adjusting nut member 4 has a central hole with a female thread thereon. The adjusting nut member 4 engages the threaded rod 3 by means of the female thread and the male thread on the rod body 31.

As shown in FIG. 1, the sucker structure according to the invention may further include a connecting member 5 connected to the adjusting nut member 4. A connecting sleeve member over the adjusting nut member 4 can be used to hang an article. The connecting member 5 may include a hook. It is obvious for those skilled in the art that the connecting sleeve member may be replaced with any other suitable connecting members. For example, the connecting member 5 may comprise a hole to insert therein a bar assembled with a plurality of hooks.

With the above structure, when the sucker body 1 is pressed on a smooth surface, and the threaded rod 3 is rotated to make the base portion 11 of the sucker body 1 move toward the base portion 21 of the supporting disk 2. An arch-shaped vacuum space is hereby defined between the smooth surface and the sucker body 1. The engagement between the U-shaped groove 24 and the projection 14 prevents air from entering the vacuum space so as to render the sucker body 1 to tightly adhere to the smooth surface. With the sucker structure of the present invention, the sucker body 1 may firmly be adhered to the smooth surface for a long time without detachment.

Figure 3:
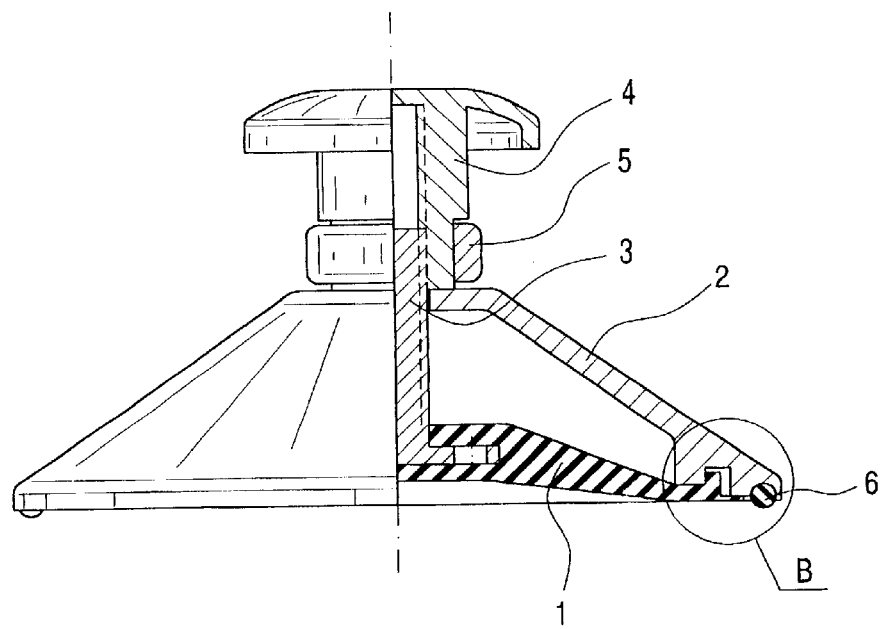
FIG. 3 is a partial cross-section view of a sucker structure according to another embodiment of the present invention.
Figure 4:
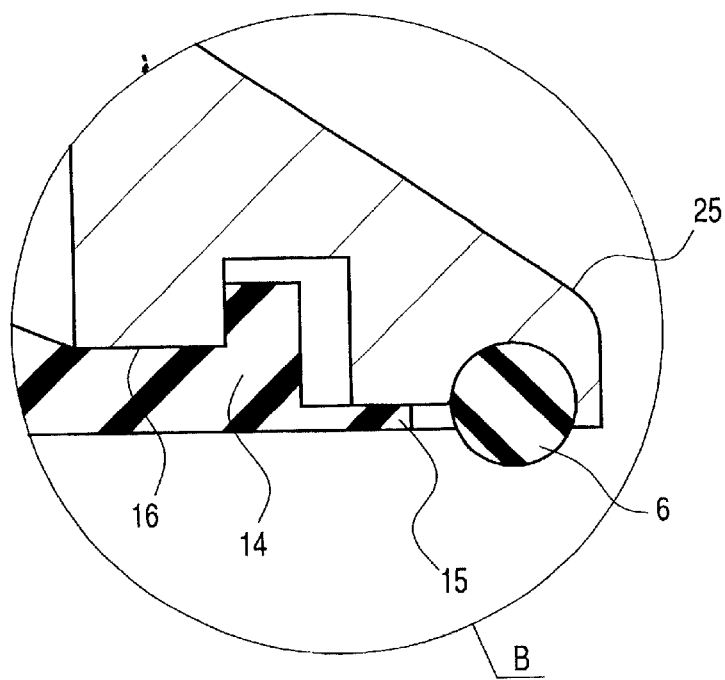
FIG. 4 is an enlarged view of section B in FIG. 3.
Figure 5:
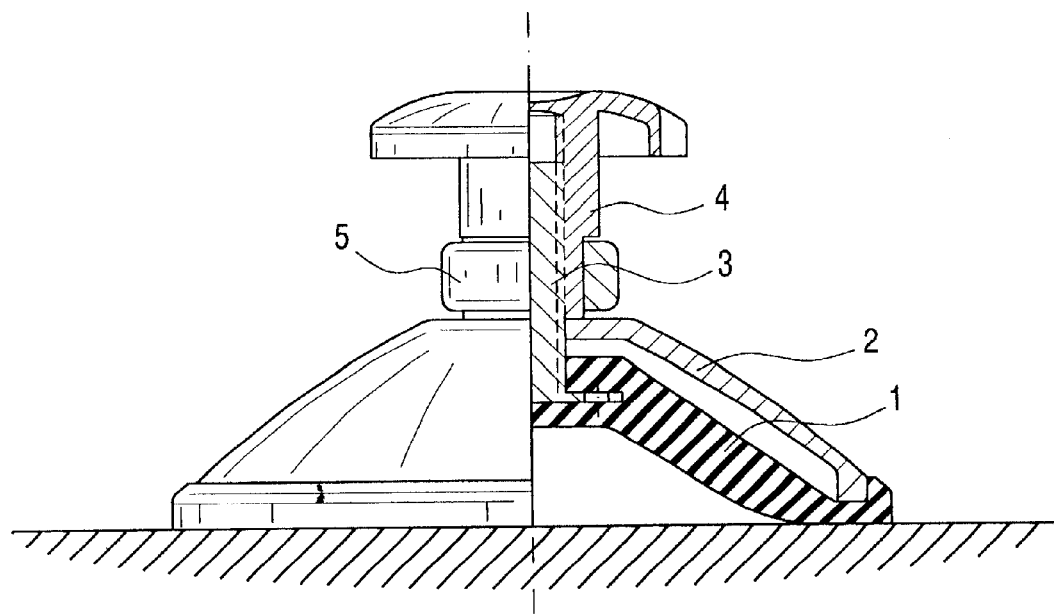
FIG. 5 is a partial cross-sectional view of a sucker in the prior art.

FIGS. 3 and 4 show a sucker structure according to another preferred embodiment of the present invention. The sucker structure further comprises an annular groove 25 with a semi-circular cross-section in the edge portion 22 of the supporting disk 2 at the outside of the U-shaped groove 24 and an annular O-ring 6 engaged with the groove 25. Other elements in FIGS. 3 and 4 are the same as those in FIGS. 1 and 2.

As shown in FIGS. 3 and 4, the semicircular groove 25 is formed in the edge portion 22 of the supporting disk 2. The semi-circular groove 25 is disposed outside of the U-shaped groove 24. The O-ring 6 is disposed in the semi-circular groove 25. When the sucker structure is pressed on a smooth surface, the O-ring 6 engages with the smooth surface. Compared with the sucker structure in FIG. 1, additional seal may be formed between the O-ring and the smooth surface. As a result, the sucker body is adhered to the smooth surface more firmly.

As can be seen from the above description, the sucker structure according to the invention makes the sucker body adhere to a smooth surface for a longer time without detachment over the prior art.

The above description is only used to illustrate the embodiments of the invention. Any modifications or variations derived therefrom should fall within the scope of the present invention.

What I claim is:

1. A sucker structure comprising:
   a sucker body make from flexible materials including a base portion having a central blind hold with a T-shaped cross-section, a rim portion having an annular projection, a recess and an outer flat edge, and a declining intermediate portion connected between said base portion and said rim portion, said recess being located between said projection and said declining intermediate portion;
   a supporting disk including an annular edge portion comprising a first annular groove engaged with said annular projection of said sucker body, said groove including a continuous annular inner wall and a continuous annular outer wall, said outer wall having a length greater than a length of the inner wall, and said annular projection of said rim portion of said sucker body including an inner surface and an outer surface corresponding to the inner wall and the outer wall, respectively, wherein the inner wall engages the recess and the outer wall engages the outer flat edge of the rim portion;
   a threaded rod including a rod body with a male thread thereon and a flange at one end thereof, wherein said flange is inserted into said central blind hole of said base portion of said sucker body to be integral with said sucker body;
   an adjusting nut member with a female thread therein engaged with said threaded rod by said female thread and said male thread; and
   a connecting member connected to said adjusting nut member for hanging an article;
   wherein engagement between said first annular groove of said supporting disk and said annular projection of said rim portion of said sucker body prevents air from entering a space formed between said sucker body and a surface on which a sucker structure is to be attached when said threaded rod is rotated to make said base portion of said sucker body move toward said supporting disk.

2. The sucker structure according to claim 1, wherein said first annular groove is a U-shaped groove.

3. A sucker structure comprising:
   a sucker body make from flexible materials including a base portion having a central blind hold with a T-shaped cross-section, a rim portion having an annular projection, a recess and an outer flat edge, and a declining intermediate portion connected between said base portion and said rim portion, said recess being located between said projection and said declining intermediate portion;
   a supporting disk including an annular edge portion comprising a first annular groove engaged with said annular projection of said sucker body, said groove including a continuous annular inner wall and a continuous annular outer wall, said outer wall having a length greater than a length of the inner wall, and said annular projection of said rim portion of said sucker body including an inner surface and an outer surface corresponding to the inner wall and the outer wall, respectively, wherein the inner wail engages the recess and the outer wall engages the outer flat edge of the rim portion, and a second annular groove outside of said first annular groove;

a sealing filler engaged with said second annular groove;

a threaded rod including a rod body with a male thread thereon and a flange at one end thereof, wherein said flange is inserted into said central blind hole of said base portion of said sucker body to be integral with said sucker body;

an adjusting nut member with a female thread therein engaged with said threaded rod by said female thread and said male thread; and a connecting member connected to said adjusting nut member for hanging an article;

wherein engagement between said first annular groove of said supporting disk and said annular projection of said rim portion of said sucker body, and the engagement between said second annular groove of said supporting disk and said sealing filler, prevents air from entering a space formed between said sucker body and a surface on which a sucker structure is to be attached when said threaded rod is rotated to make said base portion of said sucker body move toward said supporting disk.

4. The sucker structure according to claim 3, wherein said first annular groove is a U-shaped groove.

5. The sucker structure according to claim 3, wherein said second annular groove is an annular groove with a semi-circular cross-section and said sealing filler is an annular O-ring.

* * * * *